United States Patent [19]

Estela Rosell

[11] Patent Number: 4,651,843
[45] Date of Patent: Mar. 24, 1987

[54] COMPACT ASSISTED STEERING SYSTEM FOR A MOTOR VEHICLE

[75] Inventor: Jorge Estela Rosell, Barcelona, Spain

[73] Assignee: Bendiberica S.A., Barcelona, Spain

[21] Appl. No.: 816,922

[22] Filed: Jan. 7, 1986

[30] Foreign Application Priority Data

Jan. 14, 1985 [ES] Spain ............................. 539535

[51] Int. Cl.⁴ .................................... B62D 5/10
[52] U.S. Cl. ........................... 180/153; 91/533; 180/162
[58] Field of Search .............. 180/153, 158, 152, 162, 180/148, 132; 91/533, 216 R

[56] References Cited

U.S. PATENT DOCUMENTS

| 872,820 | 12/1907 | Johnson | 91/533 X |
|---|---|---|---|
| 2,108,498 | 2/1938 | McLeod | 91/216 R |
| 3,657,888 | 4/1972 | Zirps | 180/153 X |

FOREIGN PATENT DOCUMENTS 549480  4/1932  Fed. Rep. of Germany ........ 91/216

Primary Examiner—John A. Pekar
Attorney, Agent, or Firm—Larry J. Palguta; Ken C. Decker

[57] ABSTRACT

The mechanism comprises two movable cylinders (7, 9) which are sealingly slidably mounted on respective stationary pistons which are firmly carried by rods (3, 4) mounted in a stationary casing (1). One of the cylinders (9) supports a rack (11) which meshes with a control pinion (12) and which is centrally connected to the other cylinder (7) and to output members (21) which are intended to be connected to a linkage for the steerable wheels and which pass through an opening (22) formed in a lateral wall of the casing (1).

8 Claims, 5 Drawing Figures

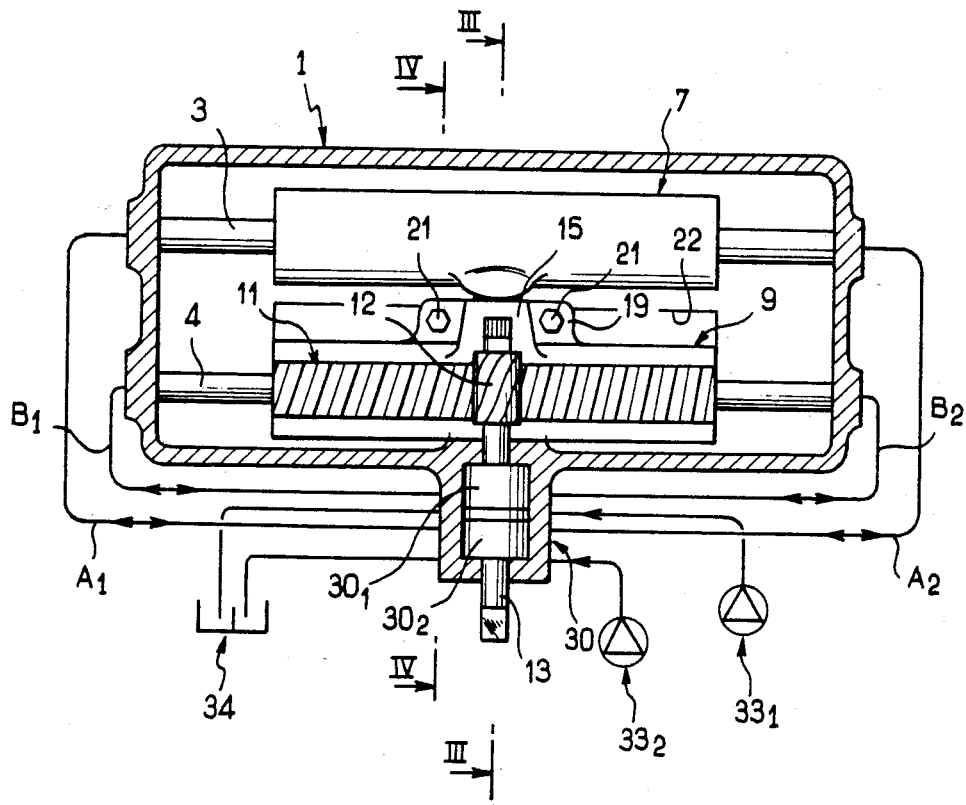
FIG_1
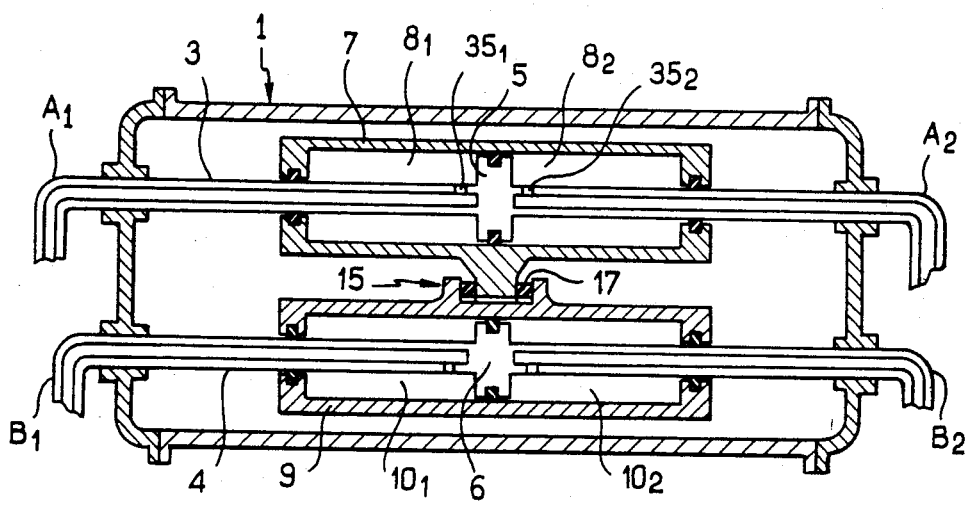
FIG_2

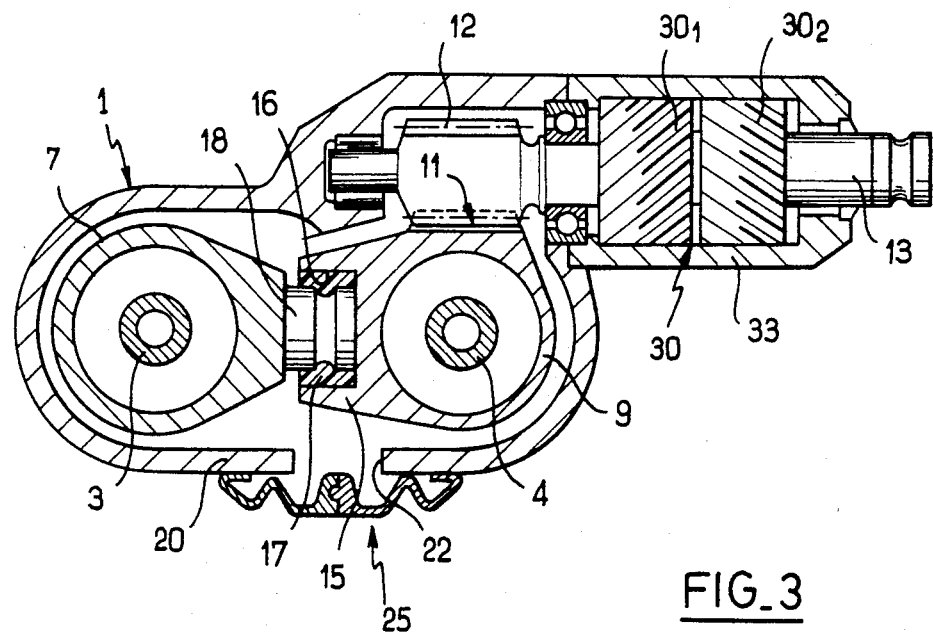
FIG_3
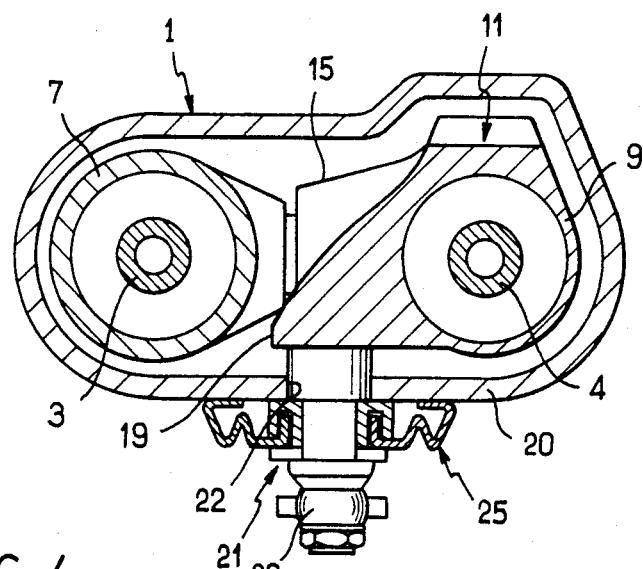
FIG_4

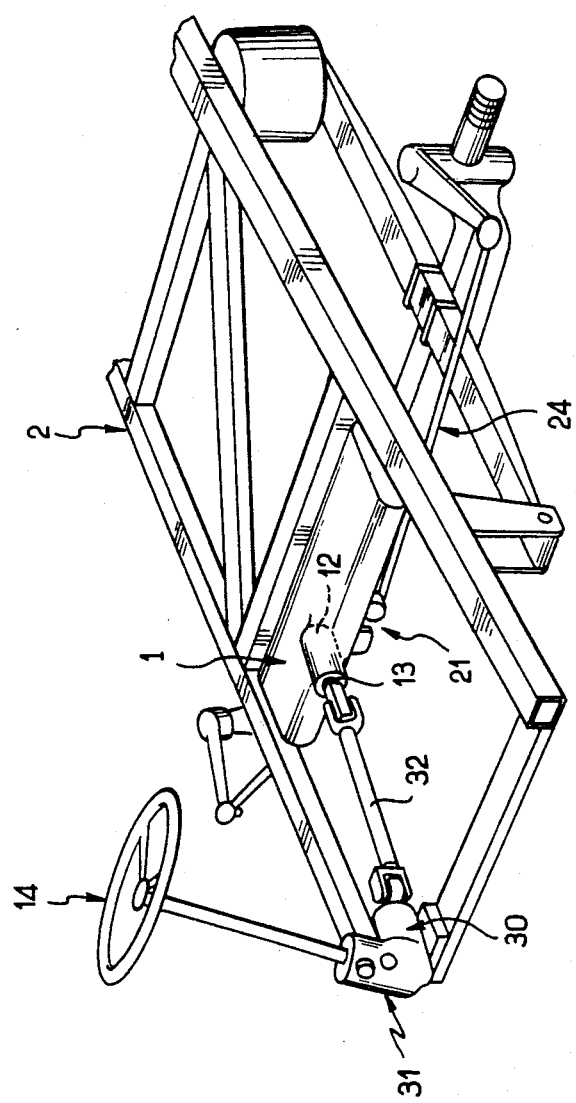
FIG._5

COMPACT ASSISTED STEERING SYSTEM FOR A MOTOR VEHICLE

The present invention relates to assisted steering systems for motor vehicles, and more particularly to an assisted steering system of the type comprising: a stationary casing in which a rack-and-pinion co-operating assembly is arranged, the pinion being intended to be connected to an input control member of the mechanism, typically a steering wheel of the vehicle, a fluid under pressure assistance assembly comprising a first fixed piston which is firmly fixed to the casing by a first stationary rod and to which is associated a first movable cylinder which is arranged so as to be parallel and coupled to the rack and which defines a first pair of pressure chambers on each side of the first piston; a distribution valve means actuatable by the input control member so as to selectively supply the chambers of the first pair of chambers with fluid under pressure; and connecting means connected to the rack and are intended to be connected to a mechanism for steering the wheels of the vehicle.

A mechanism of this type is described in the document FR-A- No. 2,357,413. In this document, the assistance assembly incorporates a single assembly with a fixed piston and a movable cylinder situated so as to be parallel to the stationary casing, outside the latter, according to an arrangement having a large number of sliding zones to be protected. In addition, in this document, the rack slides, via tubular bearings to which the assistance cylinder is connected, in the stationary casing which consequently, together with the tubular bearings, must be machined with great accuracy.

Assisted steering systems are also known, particularly from the document U.S. Pat. No. 3,249,173, using several assistance assemblies with pistons and cylinders which are connected to their own hydraulic circuits and are capable of being actuated sequentially.

The object of the present invention is to propose an assisted steering system of the type defined in the first definition above, which is of a particularly simple configuration, which is compact and robust, whose cost of manufacture is low and which allows a wide versatility of adaptation and use in a wide range of assistance forces, particularly in a hydraulic installation with twin circuits.

To achieve this, according to a feature of the invention, the mechanism comprises a second fixed piston which is firmly fixed to the casing by a second stationary rod and to which is associated a second movable cylinder which supports the rack, which defines a second pair of chambers on each side of the second piston, and to which the connecting means are connected, the distribution valve means also being arranged so as to supply selectively the chambers of the second pair of chambers.

In such an arrangement, for operation in a single circuit mode, the assistance forces may be increased considerably without involving a large increase of the overall space occupied or additional costs of manufacture. In addition this arrangement allows, also without involving additional costs of manufacture or problems of installation in the vehicle, the mechanism to be used with twin circuits which are capable of being put into operation in series and/or in parallel.

According to a more particular feature of the invention, the connecting means guidingly and sealingly extend through an opening formed in a lateral wall of the stationary casing.

With such an arrangement, of the so-called central output type, problems of mounting clearances and of the recovery of tolerances are practically eliminated, which enables the costs of manufacture and of mounting to be further reduced.

Other features and advantages of the present invention will emerge from the following description of embodiments which are given by way of illustration but are not limiting in any way, with reference to the accompanying drawings, in which: FIG. 1 is a diagrammatic plan view partially sectioned of an assisted steering mechanism according to the invention; FIG. 2 is a view in central longitudinal section of the mechanism shown in FIG. 1; FIGS. 3 and 4 are views in transverse section through the section planes III—III and IV—IV, respectively, of the mechanism shown in FIG. 1; and FIG. 5 is a diagrammatic view showing the installation of an assisted steering mechanism according to the invention in a vehicle chassis.

As shown in the drawings, the assisted steering mechanism according to the invention incorporates a stationary steering casing, given the general reference 1, which is typically made as a casting and is intended to be fixed transversely on a chassis 2 of a motor vehicle as shown in FIG. 5. A first rod 3 and a second rod 4, which are parallel to one another, extend between the lateral sides of the casing 1 and are fixed to the latter sides. The first rod 3 carries centrally a first piston structure 5. Similarly, the second rod 4 carries centrally a second piston structure 6. A first movable cylinder 7 is slidingly and sealingly mounted on the first rod 3 of the first piston structure 5 so as to define, on each side of the first piston structure 5, opposite chambers $8_1$, $8_2$ of a first pair of chambers. In a similar way, a second cylinder 9 is slidingly and sealingly mounted on the second rod 4 and on the second piston structure 6, the second cylinder 9 defining internally opposite chambers $10_1$ and $10_2$ of a second pair of chambers. The bodies of the cylinders 7 and 9 are advantageously made as castings with annular end flanges attached. In the embodiment shown, the second cylinder 9 is formed on its upper outside surface with a rack structure 11 which co-operates in meshing engagement with a pinion 12 rotatingly supported in the casing 1 and connected to an input shaft 13 of the mechanism, which is in turn intended to be connected to the steering wheel 14 of the vehicle.

The second cylinder 9 comprises a central portion 15 which extends in the direction towards the first cylinder 7 and is formed with a recess 16 within which, is housed, with the interposition of a bearing made of elastomeric material 17, a connecting projection 18 which is firmly fixed to the first cylinder 7, the two cylinders 7 and 9 thus being connected centrally to one another by an elastic coupling. The central portion 15 of the second cylinder 9 is formed with lateral webs 19 extending adjacent the bottom wall 20 of the casing 1. A shaft member 21 is fixed to each web 19 and guidingly and sealingly extends through a longitudinal opening 22 in the bottom 20 of the casing 1 for connection, via a ball joint 23, to a link 24 of a mechanism for steering the steerable wheels of the vehicle, as shown clearly in FIG. 5. A closing structure 25 for closing the slot 22 is associated with the shaft members 21 and consists of two covers with longitudinal corrugations which are releasably mutually connectable centrally by a connection of the sliding closure type of which the slider is firmly fixed to the shaft members 21, as described in document EP-A-No. 0144 259 in the name of the Applicant Company, the contents of which is assumed to be incorporated herein for reference.

The assisted steering mechanism further comprises a distribution valve means 30 which is capable of being actuated at the same time as the input shaft 13 so as to supply the chambers $8_1$, $8_2$ and $10_1$, $10_2$ selectively with liquid under assistance pressure through distribution lines $B_1$, $B_2$ and $A_1$, $A_2$, respectively. The distribution valve means 30 is advantageously of the rotary type and may be interposed at any point in the transmission between the steering wheel 14 and the pinion 12. As shown in FIG. 5, the distribution valve means 30 may be arranged at the bottom of the steering column and may be connected to an angle gear 31, the output shaft of the valve 30 being connected to the input shaft 13 which is firmly fixed to the pinion 12 by an intermediate shaft 32. As a variant, as shown in FIG. 3, the distribution valve means may be situated in a casing 33 attached to the stationary casing 1 thus being interposed directly between the input shaft 13 and the pinion 12. In this case, in order to simplify manufacture and to make mounting easier, the rack 11 may be mounted elastically on the second movable cylinder 9, as described in the document EP-A-No. 0144 259 mentioned above.

The assisted steering mechanism according to the invention may be put into operation with a single hydraulic circuit supplying the cylinders 7 and 9 in parallel via the distribution valve 30. Preferably, however, as shown in FIG. 1, the assisted steering mechanism according to the present invention is constructed in the form of a twin circuit mechanism putting into operation a twin rotary valve $30_1$ and $30_2$ which is actuatable sequentially, each valve part being concerned with a respective cylinder 7, 9 so as to supply the latter with fluid under pressure coming from its own source of pressure $33_1$ and $33_2$ and returning towards a twin reservoir 34. The twin valve $30_1$ and $30_2$ is advantageously of a type with a twin star-shaped rotor such as described in the document EP-A-No. 0166657 in the name of the Applicant Company, whose contents are assumed to be incorporated herein for reference. Although the hydraulic connections $A_1$, $A_2$ and $B_1$, $B_2$ between the distribution valve means 30 and the chambers of the cylinders 7 and 9 can be constructed as flexible tubing, these hydraulic lines are advantageously connected to the respective ends of the rods 3 and 4 which are made in the form of hollow rods, as shown in FIG. 2, thus arranging for each cylinder two central supply passages communicating with the chambers $8_1$, $8_2$ and $10_1$, $10_2$ of the cylinders on each side of each piston structure 5, 6 respectively, through holes such as $35_1$ and $35_2$ arranged in the walls of the corresponding hollow tubes 3 and 4. As shown clearly in FIGS. 3 and 4, the stationary casing 1 is shaped in such a way as to enclose completely the rods 3, 4 and the cylinders 7 and 9 so that, particularly with the hollow rods 3 and 4 and the valve means 30 arranged in the casing 33, the assembly of the assisted steering mechanism takes the form of a compact and robust unitary structure, which may easily be arranged in various ways on any type of existing vehicle chassis.

I claim:

1. An assisted steering mechanism, comprising a stationary casing in which a cooperating rack and pinion assembly is arranged, the pinion being intended to be connected to an input control member for the mechanism, a fluid pressure assistance assembly comprising a first stationary piston fixed firmly to said casing by a first rod with which is associated a first movable cylinder arranged parallel to and coupled mechanically with said rack, and defining a first pair of pressure chambers on each side of said first stationary piston, distribution valve means actuatable by said input control member so as to supply selectively with fluid pressure the chambers of the first pair of pressure chambers, and connecting means connected with said rack and intended to be connected to a mechanism for steering a wheel of a vehicle, characterized in that the mechanism comprises a second stationary piston fixed firmly to the casing by a second rod disposed parallel to said first rod, with which a second movable cylinder is associated which supports fixedly said rack and defines a second pair of pressure chambers on each side of said second stationary piston, and to which said connecting means is connected, said valve means being arranged to supply selectively the chambers of said second pair of pressure chambers.

2. The mechanism according to claim 1, characterized in that said first rod and said second rod, and said first movable cylinder and said second movable cylinder, are housed completely within said casing.

3. The mechanism according to claim 2, characterized in that said first rod and said second rod are hollow and each incorporates fluid passages which are connected respectively with the pressure chambers of the associated pair of pressure chambers.

4. The mechanism according to claim 2, characterized in that said connecting means extends guidingly and slidingly through an opening formed in a laterial wall of said casing.

5. The mechanism according to claim 1, characterized in that said second movable cylinder is connected to said connecting means and to said first movable cylinder by a central portion extending toward said first movable cylinder.

6. The mechanism according to claim 5, characterized in that said second movable cylinder is connected to said first movable cylinder by an elastic connection.

7. The mechanism according to claim 1, characterized in that the valve means comprises a first valve part and a second valve part feeding the chambers of the first pair of pressure chambers and said second pair of pressure chambers, respectively.

8. The mechanism according to claim 7, characterized in that the first valve part and the second valve part are each connected to a respective circuit supplying fluid pressure.

* * * * *